(12) United States Patent
Krishnaswamy et al.

(10) Patent No.: US 9,324,057 B2
(45) Date of Patent: Apr. 26, 2016

(54) SYSTEM AND METHOD FOR ESTABLISHING A RELATIONSHIP BASED ON A PRIOR ASSOCIATION

(75) Inventors: Venkatesh Krishnaswamy, Holmdel, NJ (US); Eunsoo Shim, Princeton Junction, NJ (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 132 days.

(21) Appl. No.: 13/189,247

(22) Filed: Jul. 22, 2011

(65) Prior Publication Data
US 2013/0024577 A1 Jan. 24, 2013

(51) Int. Cl.
| | | |
|---|---|---|
| G06F 15/16 | (2006.01) |
| G06Q 10/10 | (2012.01) |
| G06F 21/55 | (2013.01) |
| G06Q 30/02 | (2012.01) |
| H04L 29/06 | (2006.01) |

(52) U.S. Cl.
CPC ............ *G06Q 10/107* (2013.01); *G06F 21/552* (2013.01); *G06Q 30/0255* (2013.01); *H04L 63/0853* (2013.01)

(58) Field of Classification Search
CPC .............. G06F 21/552; G06Q 30/0224; G06Q 30/0255; H04L 63/0853
See application file for complete search history.

(56) References Cited

U.S. PATENT DOCUMENTS

| | | | | |
|---|---|---|---|---|
| 7,379,064 B2* | 5/2008 | Raffel | .................. | G06Q 10/063 345/440 |
| 8,261,329 B2* | 9/2012 | Gurney | ............... | G06F 21/6245 705/7.18 |
| 2005/0015386 A1* | 1/2005 | Mortensen | ........ | G06F 17/30569 |
| 2006/0031510 A1* | 2/2006 | Beck | ...................... | H04L 12/585 709/226 |
| 2007/0143408 A1* | 6/2007 | Daigle | .................. | H04L 12/581 709/206 |
| 2007/0203997 A1* | 8/2007 | Ingerman | ............. | G06Q 10/107 709/206 |
| 2007/0209069 A1* | 9/2007 | Saklikar | .............. | H04L 63/1433 726/14 |
| 2008/0243688 A1* | 10/2008 | Hart | ........................ | G06F 21/31 705/41 |
| 2008/0301788 A1* | 12/2008 | Yoakum | ................ | H04L 63/126 726/6 |
| 2009/0150297 A1* | 6/2009 | Richard | .............. | G06F 21/6245 705/80 |
| 2009/0210483 A1* | 8/2009 | Pierce | ..................... | A63F 13/12 709/203 |
| 2009/0293099 A1 | 11/2009 | Yoakum | | |
| 2010/0208666 A1* | 8/2010 | Frederiksen | ...... | H04W 72/0406 370/329 |
| 2010/0332669 A1* | 12/2010 | Yang | ..................... | G06Q 10/10 709/229 |
| 2012/0122588 A1* | 5/2012 | Berger | .................... | A63F 13/10 463/42 |

OTHER PUBLICATIONS

Yoakum, John, "Identity and Interactive Communications", Version 2-11, 14 pages, 2009.
Yoakum, John, "Identity and Privacy—The "Missing Piece" which maked things simple!", Version 1-2, 1 page, 2009.

\* cited by examiner

*Primary Examiner* — Joshua Joo
*Assistant Examiner* — Younes Naji
(74) *Attorney, Agent, or Firm* — Sheridan Ross P.C.

(57) ABSTRACT

Disclosed herein are systems, methods, and non-transitory computer-readable storage media for automatically establishing trusted relationships between users across organizational boundaries. A user makes a request to his system to create a trusted relationship with an individual of another organization. The system then analyzes the previous communication history between the user and the other individual, and, based on that analysis, sends a query to the other individual's system. The system then receives a response from the other individual's system, and if the response matches an expected response the system forms a trusted relationship between the user and the other individual.

20 Claims, 5 Drawing Sheets

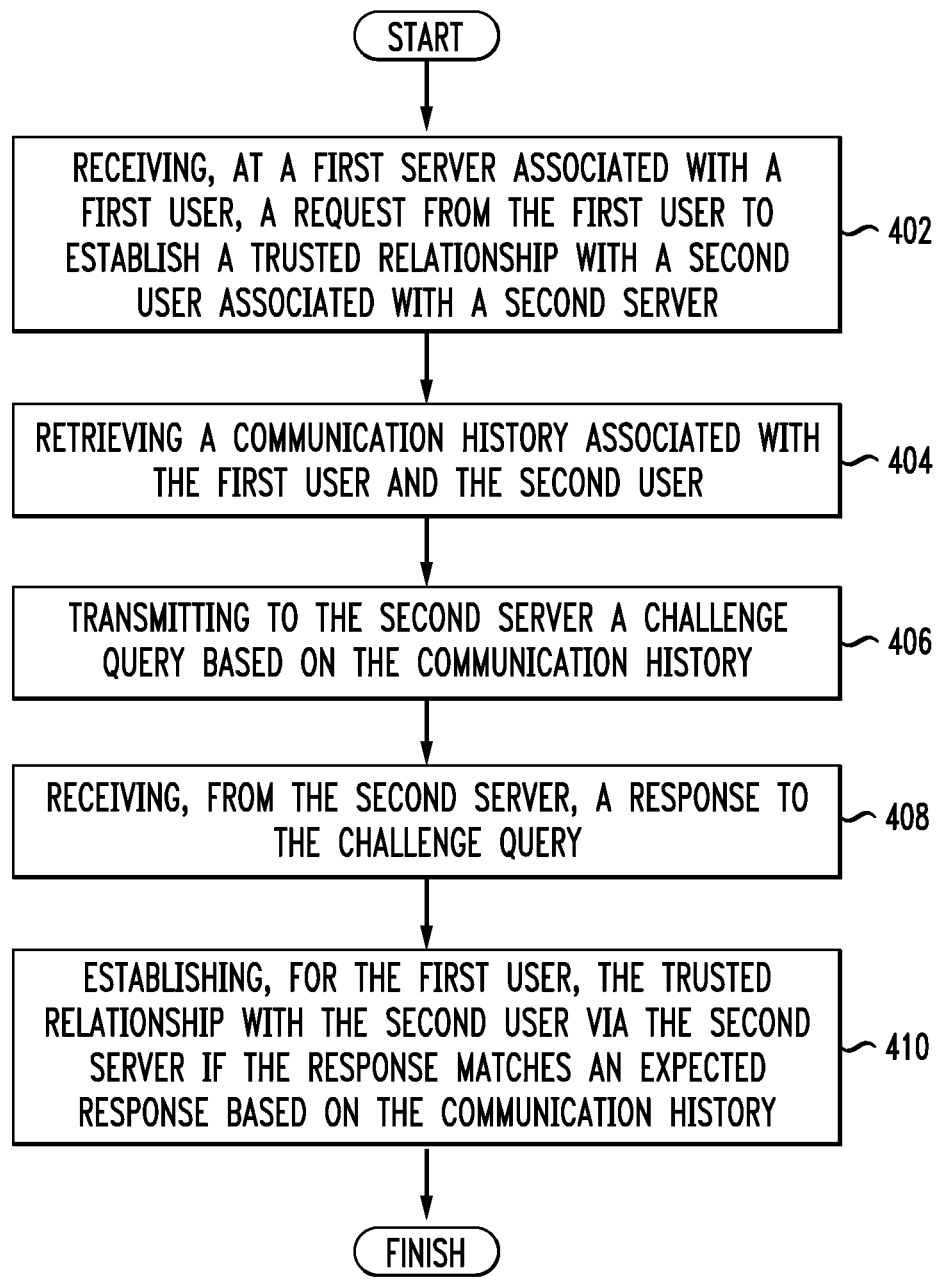

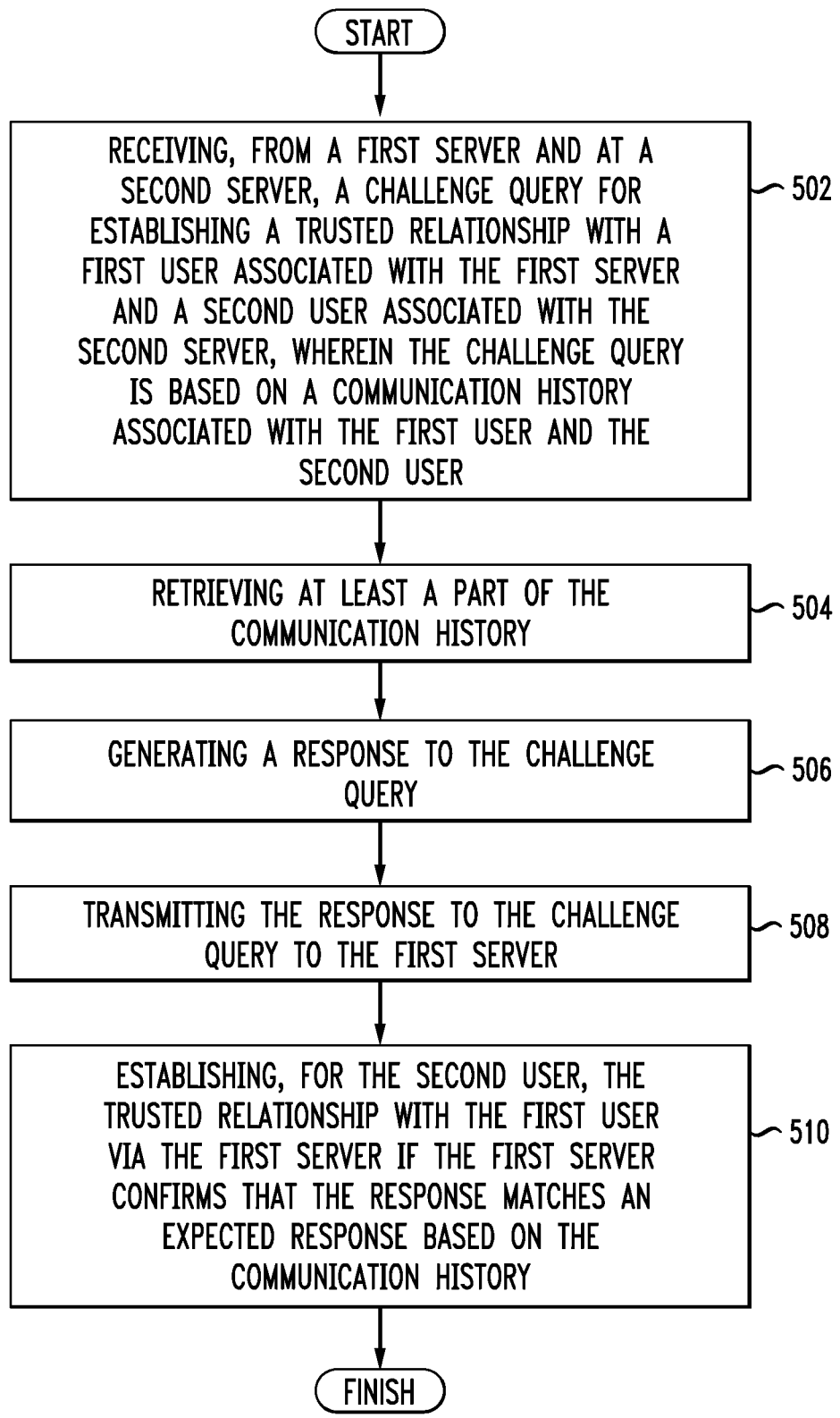

SYSTEM AND METHOD FOR ESTABLISHING A RELATIONSHIP BASED ON A PRIOR ASSOCIATION

BACKGROUND

1. Technical Field

The present disclosure relates to establishing relationships and more specifically to automatically establishing a relationship across organizational boundaries based on a shared prior association.

2. Introduction

Many organizations establish internal systems for facilitating communications within the organization. For instance, a server or cluster of servers within an organization can provide communication services such as email, instant messaging, presence information, text messaging, voice over IP (VoIP) services, corporate directory lookups, conference calling, and so forth. However, due to various security and privacy restrictions as well as organizational policy requirements, these tremendous benefits and communication opportunities are unavailable to others outside of the organization.

In some instances, users try to get around these organizational communication limitations, such as by installing instant communicator programs on their desktop computers, adding personal email accounts to smart phones, and so forth. However, many user instigated workarounds introduce a plethora of potential data security and network security issues.

This arrangement means that a first user working for a first organization and a second user working for a second organization are unable to take full advantage of the communication infrastructure of each other's organization. For instance, if the first user wants to send instant messages to the second user, the structure of the two organizations often prevent this type of direct communications, even though the two users trust each other. These users are unable to easily communicate with each other, which may be necessary for business purposes, while maintaining the secure and tightly-controlled communications architectures existing at each user's respective organization.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for automatically establishing a relationship based on a prior association. When a first user makes a request to add someone to their communication tools, the transmitted request and response are controlled by automatic agents in the form of servers. Alternatively, the servers can initiate the request on behalf of a user without user interaction and/or without the user's knowledge of the request. The first user's server examines the first user's communication history for information regarding the second user, if it exists and is available. Based on this communication history, the user's server forms a challenge, such as a question or query, the answer to which would be knowable only with access to the communication history. In one aspect, the server is careful to select only information upon which to base the query that is not classified, sensitive, or confidential. However, the challenge can be about even sensitive information because the response does not include the answer and thus there is no risk for the responder to disclose sensitive information to the challenger. Examples of the challenge can include a duration of a telephone call between the first and second user, a datestamp of an email with a specific title between the first and second user, or a file size of a file transferred during an instant messaging session. The challenging entity selects the question, query, or challenge. The first server then transmits the challenge to a second server associated with the second user. This second server then prepares a response to the challenge and sends the response to the first server. The first server compares the received response to an expected response. If the response received correctly matches the expected response based on the communication history, the first server establishes a trusted relationship between the first and second servers for the first and second users. The users and/or the servers can set a level of trust for the relationship. For example, the trusted relationship can include access to instant messaging and VoIP connections, but may prevent sharing of presence information. The trusted relationship can be symmetric or asymmetric, meaning that each server can share a same or different subset of communication functionality with the other as part of the trusted relationship.

Users receiving such requests can continue working, and indeed might not even be aware of the request, while automated servers negotiate the relationship. In another aspect, the servers can negotiate what level of trust to define between the users. For example, if creating trusted relationships for both a fellow employee of a user's business and an employee of a separate business, the fellow employee could have a higher level of trust than the employee of a separate business. This restriction could limit access to files, contact information, presence, status, updates, or otherwise available communication resources. Users can configure the server to prevent automatic relationship negotiation, where the manual intervention is triggered either by a specific level of communication history or user preference. In such instances, the negotiation process can stop and allow the user to control the level of trust being defined. A user can establish a policy or rule on the server that automatically filters or blocks requests from certain users, organizations, or groups of users. The system can filter or block requests by ignoring received challenges or by sending challenges and rejecting the response regardless of whether or not the response is correct.

In another aspect, the negotiation between servers can have various levels of encryption or protection. In most instances, the challenge question presented by the user's server can be unencrypted, because neither personally identifying information nor otherwise sensitive information is being revealed when the question is transmitted. However the response can and generally will be encrypted, because the response can reveal a piece of communication history which may be sufficient to allow access to a network or which may disclose sensitive information. This encryption can be based on a public key and/or based on the agreed-upon portion of the mutual communication history.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 4 illustrates a first example method embodiment; and

FIG. 5 illustrates a second example method embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for automatically establishing relationships across organizational boundaries. A system, method and non-transitory computer-readable media are disclosed which communicate and establish a relationship between two users based on the communication history of those users. A brief introductory description of a basic general purpose system or computing device in FIG. 1 which can be employed to practice the concepts is disclosed herein. A more detailed description of automatic relationship establishments will then follow. The disclosure now turns to FIG. 1.

Figure 1:
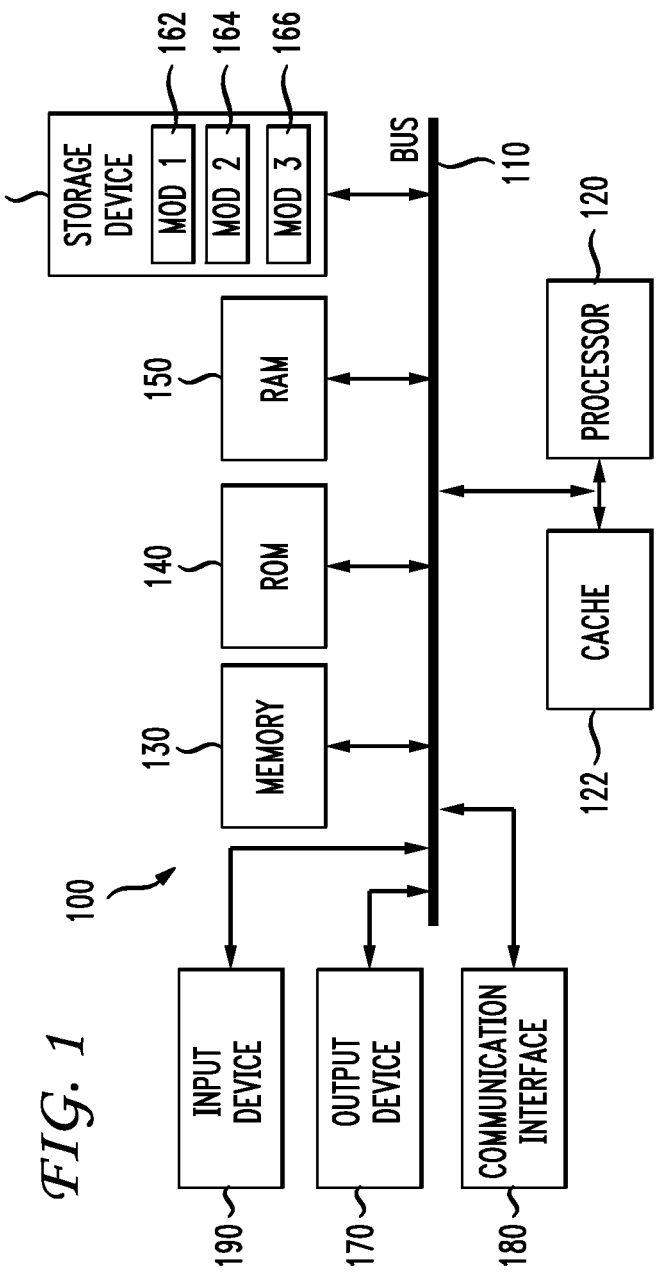
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, and the like, may also be used in the exemplary operating environment. Computer-readable storage media and devices expressly exclude transitory media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

A computer system similar to the system 100 shown in FIG. 1 can be configured to establish relationships between individuals of varying organizations. In an exemplary embodiment, the computer system is a computer server that automatically establishes relationships between individuals by accessing a user's communication history. This server is associated with a first user who desires to create a trusted relationship with a second user across some organizational boundary. The user can provide input to the server indicating that desire, or the server can determine that desire based on user actions or communications. The organization boundary means that the first user belongs to a first organization, and the second user belongs to a second organization. Various communications infrastructure configurations and security protocols prevent instant creation of a trusted relationship across this organizational boundary. To create a trusted relationship, the server associated with the first user creates a request to create a trusted relationship with the second user. The server searches previous communications, calendar events, and received messages between and/or including the first user and the second user. Based on those communications, the first server transmits to the second server associated with the second user a challenge, such as a question based on portions of a communication history between the first and second users that is available to both the first and the second servers. The second server then searches through its copy of the shared communication history, and reports to the first server a response to the challenge. Based on the response received, the first server authorizes the second user and/or the second server and continues to create a trusted relationship between the two users, continue to negotiate the level of trust of the relationship, or take some other action. If the response received is not what the first server expected, the first server can refuse to establish a trusted relationship, reduce a level of trust of an existing relationship between the users, or take other suitable actions.

Because the first server generates the challenge or query based on previous communications, the challenge should have a clear and unambiguous answer for a response, assuming that the second server has access to a legitimate copy of the communication history. The response to the challenge may be a specific response or a range of responses may be acceptable. Examples of challenges or queries include: "How many characters did our Jul. 11, 2008 email contain?", "On what day did we have a conference call last week?", "What file was sent last Wednesday?", or "When did we first meet?" The first server can select the challenge based on a range of acceptable responses. For example, in a high security situation, the first server avoids asking a question which can be answered with a day of the week, because an imposter can guess the answer and have a 1 in 7 chance of guessing the correct answer. Rather, the first server in a high security situation generates a challenge that has a correct response that is much less likely for an imposter to guess correctly, such as a checksum of an attached file. The security or level of trust of the subsequently established trusted relationship can be based, at least in part, on the difficulty or unguessability of the challenge. In another aspect, the first server can generate and send a series of challenges, possibly increasing in difficulty, until the first server is satisfied, based on an identity verification threshold, that the responses from the second server are authentic. This series of challenges can be sent to the second server serially, with new questions being sent after receiving each response, or can be sent en masse as a group of queries. The first server determines the content and quantity of queries sent to the second server. The first server can send the challenges or queries in plain text format, and can include information regarding how to respond in a proper fashion. For example, upon forming a communication query, the first server attaches information about what key and cipher system to use to encrypt the response. In one variation, the first server and the second server operate according to a previously established challenge/response standard.

The users may also provide questions and answers from which the servers construct challenges and responses. That is, when user A requests establishment of a relationship with user B, user A can provide questions and the expected answers to server A. User A selects questions having answers that are private, but which should be known to user B. Examples of such questions are the name of user A's daughter or the school they attended together. When these questions are included in the challenge from server A to server B, because server B most likely will not find the answers from the communication logs or other usual electronic data sources, server B can pass the questions to the client device used by user B. User B's client device presents the questions to user B who provides the answers. Upon receiving the answers from user B's client device, server B constructs the response and sends it to server A.

The shared information or knowledge on which the questions and answers are built by the users can also come from also prior communications between the users. The prior communications can occur via the communication channels whose communication logs are not available or accessible to the first and second server. A verbal conversation is an example of such communication channel. So the communication history from which the challenges and responses are constructed by the servers may exist in a form accessible to the servers or in a form not accessible to the servers. In the latter case, the users need to provide the information to the servers.

Because the first and second servers rely on a common communication history, if two individuals have never communicated they will be unable to create a trusted relationship. When this happens, the first server may request first user to provide suitable questions from which the first server constructs the challenge. Another option is to use information from communications where the users are referred. For example, the respective bosses of user A and user B direct A and B to work on a project, however A and B never correspond. User A can then request to communicate with B through their respective servers, and because the server of A contains the communication history from A's boss to A, and the server of B contains the communication history of B's boss to B, the servers of A and B can negotiate and open communications, despite the lack of direct communication between A and B. In this way, the communication history can include direct communications between user A and B as well as associated communications which mention user A or B or have been forwarded to user A or B, for example.

The second server, upon receiving the query, can respond to the first server with another query. Reasons for this could include a higher threshold for creating a relationship of trust, unfamiliarity with the first server, or organizational protocols. In such circumstances, the second server can wait to respond to the first server's query until receiving a response from the first server, or can send a response prior to receiving the first server's response. Protocols can determine the order in which servers must respond, preventing the servers from locking in a state of each server refusing to respond until their query is answered. The systems can exchange challenges in both directions so that each can confirm that the other is authentic and/or has access to the correct data set.

In certain instances, the response to the query does not align perfectly with the expected result or range of expected results. In such instances, a system configured to automatically establish relationships can continue to correspond with another server by: searching the communication history, building a new query, sending that query, receiving a response, and determining a trust level based on that response. Each iteration of this process can initiate a fresh determination of the response's effectiveness. Based on the response the system may conclusively determine that there is, in fact, no relationship and terminate the exchange. In other instances, the response may match the expected response, in which case a trusted relationship is created. In yet other instances, the response may be close, but not perfect, in which case the system may continue posing queries, terminate the query/response process, establish a trusted relationship, or create a trusted relationship with a trust level based on the series of exchanges that differs from the trust level that would otherwise be assigned.

The trust level assigned to a relationship can determine which files, contact information, status and presence updates, types of interactive media (voice, video, text, etc.), permissible bandwidth consumption, encryption requirements, and other communication resources are available to individuals in the relationship. Trust levels can vary according to what the first user wants, criteria set by a user or the user's organization, and/or the correctness of responses. In certain embodiments, all users between whom a trusted relationship exists have equal and open access to files, contact information, presence, status, updates, and/or other available communication resources. However, the system can limit access to certain communication resources based on the specific relationship created. Exemplary reasons for limiting access include differences in organization, specific areas of mutual interest, or a user defined level of trust.

The varying levels of trust can be reflective of the depth of shared communication history between the two individuals. Below a threshold of communication history, the system can generate a single challenge or query. Below another threshold, the system can generate two challenges or queries, and above yet another threshold of communication history, the challenge or query becomes more of an identification and correspondence than inquisition.

Figure 2:
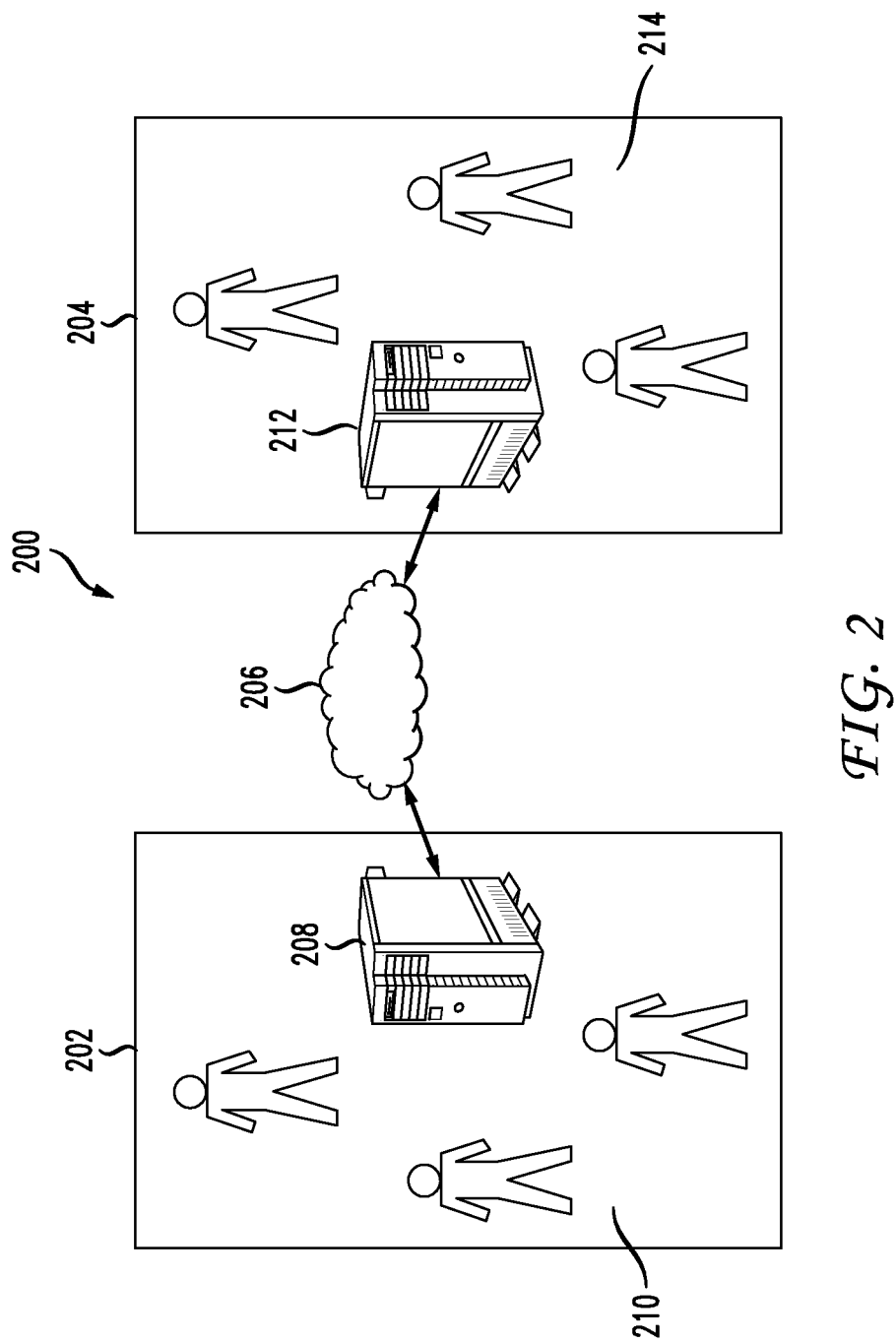
FIG. 2 illustrates two separate organizations connected by a network.

FIG. 2 illustrates typical communication organizations 200. Two separate organizations 202, 204 are connected via a network 206, such as the Internet, the publicly switched telephone network, or other single network or collection of networks. Within each organization 202, 204 are individuals 210, 214. The members 210 of the first organization 202 communicate internally one with another via one or more organization servers 208, and likewise the members 214 of the second organization 204 communicate internally with each other via one or more organization servers 212. The servers 208, 212 can include computers, switches, and other software and/or hardware components of communications infrastructure. These servers 208, 212 can connect to one or more communications network 206 such as the Internet and the publicly switched telephone network. However, because of the organizational boundaries 202, 204 and security policies governing communications across those boundaries, the ability for the members 210 of the first organization 202 to communicate directly with members 214 within the second organization 204 is limited or completely unavailable.

Figure 3:
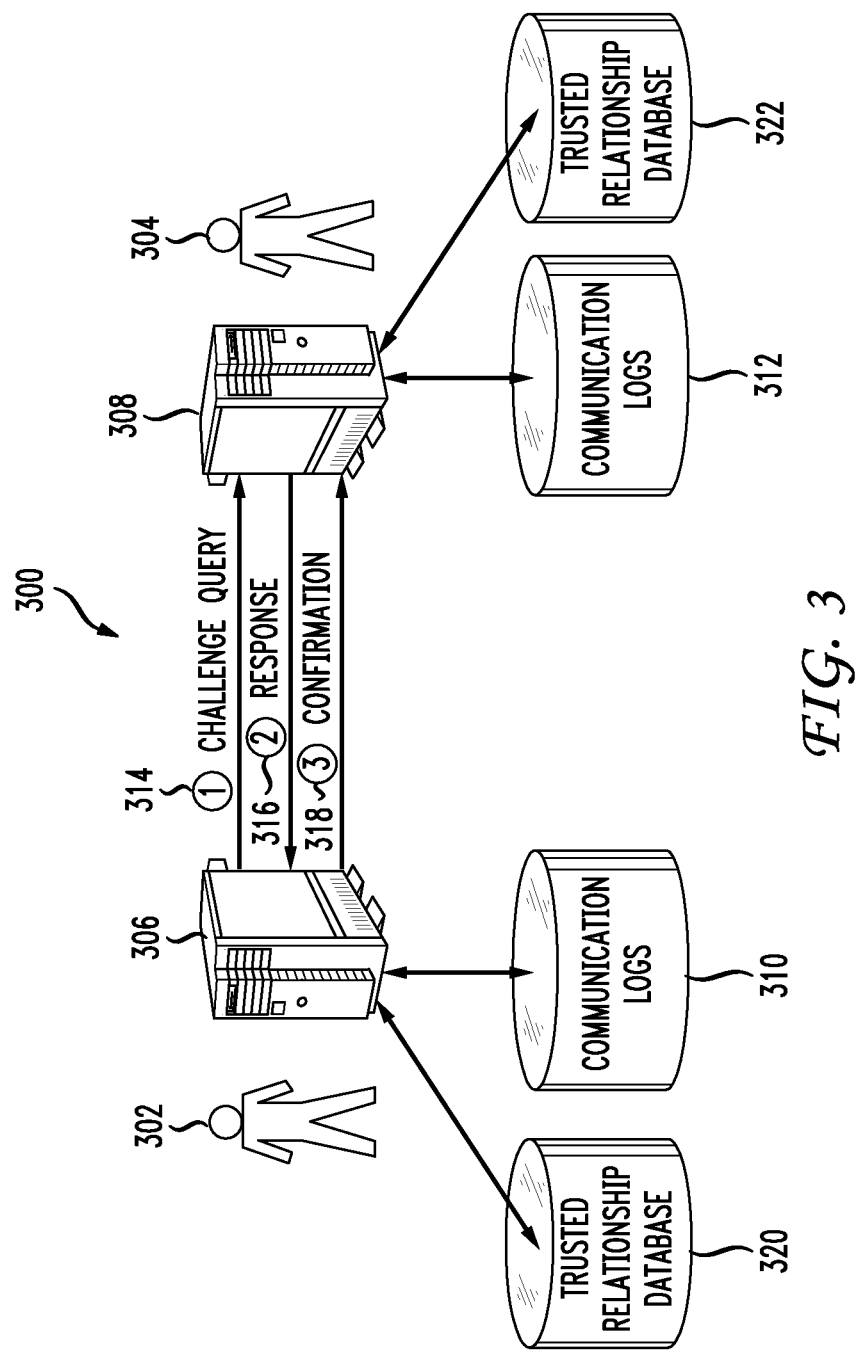
FIG. 3 illustrates an example of two systems configured to automatically establish a relationship based on a prior association.

FIG. 3 illustrates an example of two systems each configured to automatically establish a relationship based on a prior association working together 300. Here a first user 302 wishes to establish a relationship with another user 304. This second user 304, however, belongs to another organization, and one or more security or privacy restriction limits the amount, type, and availability of information relating to communications across this organizational boundary. The first user 302 then communicates the desire to form a relationship with a server 306 which belongs to the first user's organization. The server 306 then searches through the communication logs 310 for instances of contact or references to the second user 304. If no such communications exist, then the server 306 can reply to the first user 302 that such a relationship requires contact, or the server 306 may initiate such contact. In most instances some communication history common to both users 302, 304 will exist. The first server 306 then creates a challenge query 314 and transmits this query to another server 308 belonging to the other organization of the other user 304. The challenge query 314 can be based on the common communication history, other sources common to both parties, and/or information which should be known to the second user 304. Examples of other information which should be known to the second user 304 include the second user's birthday or the name of the second user's boss. The first server 306 can discover the other server 308 based on the communication history, by looking the server 308 up in a directory of organization communication servers, or by any other server discovery approach. This server 308 receives the query 314 and formulates an answer to the query based on its own communication logs 312. If the answer is not found in the communication logs, the server 308 can prompt the second user 304 for an answer to the query 314. The server 308 can prompt the second user 304 via an on-screen popup, an automated voice interface, text message, and/or other ways of communicating with the second user 304. The server 308 can determine how to contact the second user 304 based on presence information of the second user 304 and/or based on a relationship importance level between the first user and the second user.

The second server 308 then transmits the answer as a response 316 back to the first server 306. The response 316 can include or exclude the query, and can be either unencrypted or encrypted. When the response does not include the query, the response can resemble random information, presenting a difficult challenge to interpret for attackers. If encrypted, the response 316 can be encrypted using the query or the response as a base, key, or password to unlock the encryption, or can use a key common to both users. The sensitivity of the information being transmitted, as well as the trust levels being granted, are factors for determining if the system 100 encrypts the response. The response 316 is received by the first server 306, which determines if the response 316 is sufficient to establish a trusted relationship. If not, then the process of creating queries 314 and receiving responses 316 can continue until the system 100 has sufficient information to determine if a relationship exists. In some instances, this determination is based on the number of attempts to derive a correct response, whereas in other instances this determination can be based on the proximity of a response to the expected response.

Upon receiving a response 316 meeting expectations, the server 306 creates a trusted relationship between the first user 302 and the second user 304. Creating a trusted relationship can include recording the relationship in a trusted relationship database 320 as well as sending confirmation 318 to the other server 308 that a trusted relationship has been approved. The confirmation 318 sent to the other server 308 can be a secret key or token, granting access to first user's 302 information, server, or data. The confirmation can be a text or binary based message indicating that establishment of the relationship or the rejection of the request to establish a relationship. The second server 308, upon receiving this confirmation 318, similarly stores the trusted relationship in a unique trusted relationship database 322 belonging to the second organization. In the trusted relationship databases 320, 322, information stored can include the individuals in the trusted relationship, the level of trust and access given to the individuals, as well as the basis for establishing the relationship. The trusted relationship database can be contained wholly within a single organization or can be distributed across two or more organizations. A third party can store and provide access to the trusted relationship database. In some variations, the database is not embodied as a separate store of data but rather is embodied as a set of rules or configurations governing how communication infrastructure of two organizations are allowed to communicate one with another to facilitate user to user contact. In certain embodiments, each organization utilizes a single set of server and storage resources, whereas in other embodiments a distributed set of servers cooperate to perform communication and data storage services necessary for each organization.

Having disclosed some basic system components and concepts, the disclosure now turns to the exemplary method embodiments shown in FIGS. 4 and 5. For the sake of clarity, each of the methods is discussed in terms of an exemplary system 100 as shown in FIG. 1 configured to practice the respective method. The steps outlined herein are exemplary and can be implemented in any combination thereof, including combinations that exclude, add, or modify certain steps.

FIG. 4 illustrates an example method embodiment. A system 100, such as a first server associated with a first user, receives a request from the first user to establish a trusted relationship with a second user associated with a second server (402). The system 100 then retrieves a communication history associated with the first user and the second user (404) and transmits to the second server a challenge query based on the communication history (406). This challenge query can be based on at least one specific detail of a communication in the communication history, such as the subject of an email, the size of an attachment, an email header, a time of communication, duration of communication, metadata describing the communication, list of participants in the communication, and the content of the communication. The communication history can include communications between the first user and the second user and/or communications referring to at least one of the first user and the second user. The system can transmit the query in plain text or in other non-encrypted data transmission formats. The system 100 then receives, from the second server, a response to the challenge query (408) and establishes, for the first user, the trusted relationship with the second user via the second server if the response matches an expected response based on the communication history (410). The response to the challenge question can be encrypted based on at least one of the challenge query and an answer to the challenge query. Based on the answer, the system may not decrypt the response if the first server was expecting a different answer. Certain situations, such as when both users have confidence in the secured nature of their network connections, may eliminate the need for encryption in the response. In certain instances, establish the trusted relationship further includes elevating a level of trust for an existing trusted relationship. In other instances, an analysis of the communication history can occur, and based on this analysis a specific trust level can be established for the trusted relationship.

Based on this trusted relationship, the first server and the second server can establish communications between the first user and the second user. Moreover, the first server can share first non-public contact information and other communications-related data of the first user with the second server and the second server can share second non-public contact information of the second user with the first server. The type and amount of non-public contact information shared in such instances is based on the trusted relationship.

FIG. 5 illustrates a second exemplary method embodiment from the perspective of the second server. Here, the second server 100 receives from a first server a challenge query for establishing a trusted relationship with a first user associated with the first server and a second user associated with the second server, wherein the challenge query is based on a communication history associated with the first user and the second user (502). The system 100 retrieves at least a part of the communication history (504) and generates a response to the challenge query (506). This response to the challenge query is then transmitted to the first server (508), where the system establishes, for the second user, the trusted relationship with the first user via the first server if the first server confirms that the response matches an expected response based on the communication history (510).

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein could be applied to relationships between individuals of multiple organizations, or even sub-organizations. Those skilled in the art will readily recognize various modifications and changes that may be made to the principles described herein without following the example embodiments and applications illustrated and described herein, and without departing from the spirit and scope of the disclosure.

We claim:

1. A method comprising:
   preventing, by a first server associated with a first user, the first user from establishing a voice over Internet protocol communication with a second user associated with a second server via the first server without a trusted relationship having been established between the first user and the second user;
   receiving, at the first server, a request from a user device associated with the first user to establish the trusted relationship with the second user;
   retrieving, at the first server, a first communication log associated with the first user, the first communication log comprising a prior communication between the first user and the second user;
   discovering, by the first server, the second server based on the prior communication;
   transmitting from the first server to the second server a challenge query based on the first communication log, wherein the challenge query concerns at least one of a subject of an email in the prior communication, a size of an attachment in the prior communication, an email header in the prior communication, a time of the prior communication, or a duration of the prior communication;
   receiving, from the second server, a response to the challenge query, the response having been generated by the second server based on a second communication log associated with the second user, the second communication log comprising the prior communication between the first user and the second user; and
   when the response matches an expected response based on the first communication log, establishing the trusted relationship between the first user and the second user and allowing the first user to establish the voice over Internet protocol communication between the first user and the second user via the first server and the second server.

2. The method of claim 1, wherein the first communication log further comprises another prior communications referring to at least one of the first user or the second user.

3. The method of claim 1, wherein the first user identifies, in the challenge query, the prior communication from which the challenge query is constructed.

4. The method of claim 1, wherein the response generated by the second server is further confirmed by the second user.

5. The method of claim 1, wherein the response is encrypted based on at least one of the challenge query or an answer to the challenge query.

6. The method of claim 1, wherein the first server belongs in a first organization and the second server belongs in a second organization, the first organization and the second organization being separated by an organizational boundary, and wherein the first server and the second server comprise security and privacy restrictions that limit at least one of amount, type, or availability of information relating to communications across the organizational boundary.

7. The method of claim 1, further comprising:
   performing an analysis of the first communication log; and
   based on the analysis, establishing a trust level for the trusted relationship.

8. The method of claim 1, wherein, based on the trusted relationship, the first server and the second server establish a communication between the first user and the second user.

9. The method of claim 1, wherein, based on the trusted relationship, the first server shares first non-public contact information of the first user with the second server and the second server shares second non-public contact information of the second user with the first server.

10. The method of claim 1, further comprising:
    receiving from the second server a second challenge query based on the second communication log; and
    transmitting to the second server a second response to the second challenge query prior to establishing the trusted relationship.

11. The method of claim 7, wherein the trust level determines whether at least one of files, contact information, status updates, presence updates, types of interactive media, permissible bandwidth consumption, or encryption requirements is available to individuals in the trusted relationship.

12. The method of claim 1, wherein the response is generated by the second server without the second server receiving an input from the second user concerning the challenge query.

13. A system comprising:
    a first processor; and
    a first non-transitory computer-readable storage medium storing instructions which, when executed by the first processor, cause the first processor to perform operations comprising:
    preventing, by a first server associated with a first user, the first user from establishing a voice over Internet protocol communication with a second user associated with a second server via the first server without a trusted relationship having been established between the first user and the second user;

discovering, by the first server, the second server based on a prior communication;

a second processor; and a second non-transitory computer-readable storage medium storing instructions which, when executed by the second processor, cause the second processor to perform operations comprising:

receiving, from the first server, a challenge query for establishing the trusted relationship between the first user and the second user, wherein the challenge query is based on a first instance of communication history associated with the first user and the second user, wherein the first instance of communication history is stored on the first server, wherein the challenge query concerns at least one of a subject of an email in the prior communication found in the first instance of communication history, a size of an attachment in the prior communication, an email header in the prior communication, a time of the prior communication, or a duration of the prior communication;

retrieving, at the second server, a second instance of communication history associated with the first user and the second user, wherein the second instance of communication history is stored on the second server;

generating a response to the challenge query at the second server based on the second instance of communication history and without receiving an input from the second user concerning the challenge query;

transmitting the response from the second server to the first server; and when the first server confirms that the response matches an expected response based on the first instance of communication history, establishing, at the second server, the trusted relationship between the first user and the second user and allowing the first user and the second user to establish the voice over Internet protocol communication between the first user and the second user.

14. The system of claim 13, wherein the first user identifies, in the challenge query, the prior communication from which the challenge query is constructed.

15. The system of claim 13, wherein the second user confirms the response generated by the second server.

16. The system of claim 13, wherein the first server belongs in a first organization and the second server belongs in a second organization, and wherein the first server and the second server comprise security and privacy restrictions that limit at least one of amount, type, or availability of information relating to communications across the organizational boundary.

17. A computer-readable storage device storing instructions which, when executed by a processor, cause the processor to perform operations comprising:

preventing, by a first server associated with a first user, the first user from establishing a voice over Internet protocol communication with a second user associated with a second server via the first server without a trusted relationship having been established between the first user and the second user;

receiving, at the first server, a request from a user device associated with the first user to establish the trusted relationship with the second user;

retrieving, at the first server, a first communication log associated with the first user, the first communication log comprising a prior communication between the first user and the second user;

discovering, by the first server, the second server based on the prior communication;

transmitting from the first server to the second server a challenge query based on the first communication log, wherein the challenge query concerns at least one of a subject of an email in the prior communication, a size of an attachment in the prior communication, an email header in the prior communication, a time of the prior communication, or a duration of the prior communication;

receiving, from the second server, a response to the challenge query, the response having been generated by the second server based on a second communication log associated with the second user, the second communication log comprising the prior communication between the first user and the second user; and when the response matches an expected response based on the first communication log, establishing the trusted relationship between the first user and the second user and allowing the first user to establish the voice over Internet protocol communication between the first user and the second user via the first server and the second server.

18. The computer-readable storage device of claim 17, storing additional instructions which, when executed by the processor, cause the processor to perform further operations comprising:

performing an analysis of the first communication log; and based on the analysis, establishing a trust level for the trusted relationship.

19. The computer-readable storage device of claim 17, wherein, based on the trusted relationship, the first server and the second server establish communications between the first user and the second user.

20. The computer-readable storage device of claim 17, wherein the first server belongs in a first organization and the second server belongs in a second organization, the first organization and the second organization being separated by an organizational boundary, and wherein the first server and the second server comprise security and privacy restrictions that limit at least one of amount, type, or availability of information relating to communications across the organizational boundary.

* * * * *